United States Patent [19]
Kerschner

[11] 3,718,403
[45] Feb. 27, 1973

[54] SEALING MEMBER
[75] Inventor: James J. Kerschner, Buffalo, N.Y.
[73] Assignee: Acme Highway Products Corporation, Buffalo, N.Y.
[22] Filed: Feb. 16, 1971
[21] Appl. No.: 115,520

[52] U.S. Cl..................................94/18, 277/237
[51] Int. Cl..............................................E01c 11/10
[58] Field of Search ......94/18, 18.2; 277/237, 34, 12

[56] References Cited
UNITED STATES PATENTS
3,276,336  10/1966  Crone...................................94/18.2

Primary Examiner—Joseph R. Leclair
Assistant Examiner—Robert L. Smith
Attorney—Christel & Bean

[57] ABSTRACT

A resilient sealing member for use in an expansion joint comprising a tubular structure provided with an internal construction including support bars which are pre-formed to facilitate the controlled folding thereof.

6 Claims, 2 Drawing Figures

PATENTED FEB 27 1973

3,718,403

INVENTOR.
James J. Kerschner
BY
Christel & Bean
ATTORNEYS.

SEALING MEMBER

BACKGROUND OF THE INVENTION

This invention relates to sealing members and, more particularly, to sealing members employed in expansion joints which are disposed in grooves formed between adjacent pavement blocks or other structural elements.

In the construction of highways, bridges, airfields, sidewalks, architectural concourses and the like in which pavement slabs of concrete or other paving materials are used, provision must be made for the expansion and contraction of such slabs due to variations in temperature. Conventionally, grooves are provided between adjacent slabs to accommodate the expansion and contraction thereof. Such grooves are sealed to preclude the entry of liquids and solid materials therein and to prevent such foreign matter from passing through the grooves and beneath the pavement. These grooves can be sealed by expansion joints which include resilient, elastic seals which can be compressed when the groove is contracted due to expansion of the pavement material and which expand to maintain groove seal when the groove is expanded due to contraction of the pavement material.

Often, these seals are provided with internal supporting truss structures comprising a plurality of ribs and cross bars defining numerous spaces or openings therebetween to accommodate folding of the ribs and bars during compression, and such seals are enjoying increased acceptance for many purposes. However, a problem is presented where specification requirements severely limit the maximum reaction force permitted to be generated by such seals in a compressed state.

SUMMARY OF THE INVENTION

It is an object of the present invention to provide a tubular sealing member incorporating a simple internal supporting truss construction, which provides the requisite sealing pressure while generating a limited maximum reaction force.

It is another object of this invention to provide the foregoing sealing member with internal compression members acting against the sealing member side walls and which are pre-formed to facilitate the controlled collapsing thereof in a manner precluding the build up of excessive reaction forces.

It is a further object of this invention to provide the foregoing sealing member with a simple internal truss structure defining a relatively large open area into which such structure is caused to fold in a controlled manner.

The sealing member of the present invention is characterized by the provision of an internal truss construction incorporating supporting members having angularly related portions to facilitate the controlled folding thereof.

The foregoing and other objects, advantages and characterizing features of the present invention will become clearly apparent from the ensuing detailed description of an illustrative embodiment thereof, taken together with the accompanying drawing wherein like reference numerals denote like parts throughout the various views.

BRIEF DESCRIPTION OF THE DRAWING FIGURES

FIG. 1 is a perspective view of one end of a sealing member constructed in accordance with this invention and shown in its uncompressed state, being broken away to indicate indeterminate length; and FIG. 2 is an end elevational view of the sealing member of FIG. 1, shown in a compressed state between adjacent structural sections which are broken away for convenience in illustration.

DETAILED DESCRIPTION OF THE ILLUSTRATED EMBODIMENT

Figure 1:
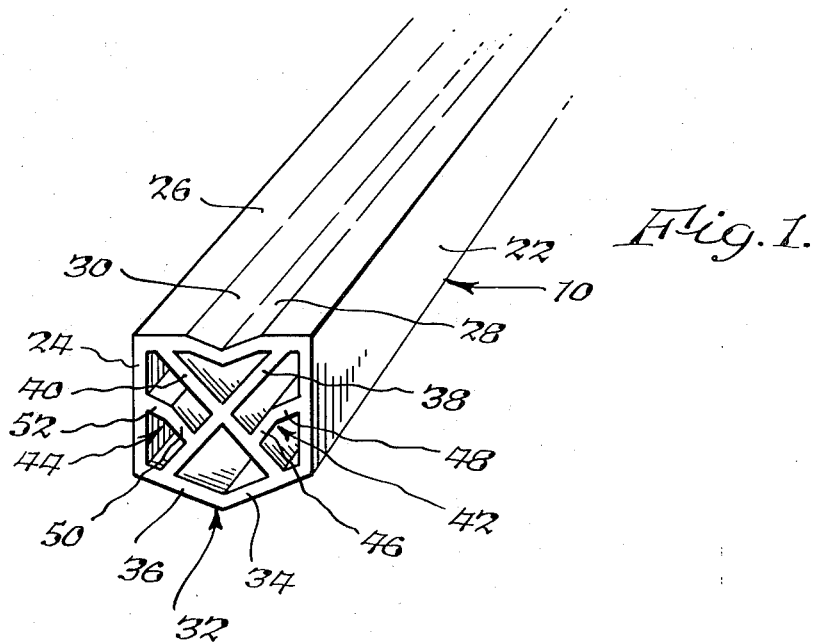
Figure 2:
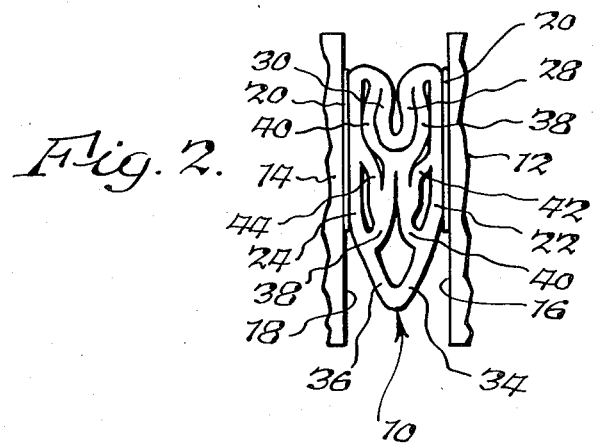

Referring now in detail to the illustrative embodiment depicted in the drawings, there is shown an elongated, resiliently, yieldable sealing member, generally designated 10, constructed in accordance with this invention. FIGS. 2 illustrates sealing member 10 compressed between a pair of spaced structural members 12 and 14 having opposed surfaces 16 and 18 defining a groove therebetween. Structural members 12 and 14 can be pavement slabs or metal angle members partially embedded in concrete or other construction material to accommodate a single sealing member 10. Members 12 and 14 also can represent laterally spaced beams extending longitudinally in the expansion groove between adjacent slabs for separating and supporting a series of laterally spaced sealing members 10 in a composite compression sealing system. The insertion of sealing member 10 into the groove defined by members 12 and 14 is facilitated by the application to faces 16 and 18 of a thin layer of a suitable lubricant-adhesive 20 which, when set, cements sealing member 10 in place.

Sealing member 10 preferably is composed of an elastomeric material, such as neoprene for example, or any other suitable resiliently yieldable material having similar properties of durability and high abrasion resistance, adequate compression and expansion capabilities, and capable of withstanding temperature extremes, sunlight, weathering, oxidation and deleterious chemicals. Sealing member 10 is extruded as a unitary, one-piece construction and can take various outside dimensions to conform to the width of the groove in which it is to be used and can be of any length. Also, it should be understood that the sealing member of this invention has general utility in various expansion joint applications including, without limitation, bridges, highways, sidewalks, airfield runways, architectural concourses, and the like.

Sealing member 10 comprises side walls 22 and 24 which are substantially parallel and straight from end to end and from top to bottom. The upper edges of side walls 22 and 24 are connected to a top wall 26 having downwardly sloping portions 28 and 30 located centrally of the top wall and which converge to form a V-shaped recess which facilitates downward movement of top wall 26 when the sides 22, 24 of sealing member 10 are pressed toward each other, thereby avoiding the entension of any portion of sealing member 10 above the top surface of the adjacent members 12, 14. As used herein, the terms upper, lower, top, bottom, vertical, horizontal and the like are applied only for convenience of description with reference to the drawing and should not be taken as limiting the scope of this invention.

The lower edges of side walls 22 and 24 are connected to a bottom wall 32 having downwardly sloping portions 34 and 36 which converge to form a V-shaped bottom wall. Top and bottom walls 26, 32 are formed integral with side walls 22 and 24 to form corners therewith and define a tubular structure. The juncture or intersection of side walls 22 and 24 with bottom wall 32 can be curved rather than angular, if desired, to provide rounded corners.

Sealing member 10 is provided with an internal supporting truss structure comprising a pair of cross bars 38 and 40 which extend diagonally from the horizontal portions of top wall 26 to the opposite portions 36 and 34 of bottom wall 32. Cross bars 38 and 40 are more sharply inclined than top wall portions 28, 30, and intersect approximately midway between their respective opposite ends leaving a V-shaped space therebetween in the upper half of sealing member 10 into which the sloping portions 28 and 30 of top wall 26 can fold when side walls 22 and 24 are pressed toward each other. Also, intersecting cross bars 38 and 40 define large open spaces on opposite sides thereof and in the lower half of the sealing member into which various portions of sealing member 10 can collapse when compressed.

When the top wall folds downwardly into a sealing member of this general type, the upper corners of the sealing member tend to roll away from their associated support surfaces, fracturing the bond therebetween and permitting the ingress of moisture and other deleterious matter. Intersecting cross bars 38 and 40 terminate at the top and bottom walls of sealing member 10 at points adjacent but spaced slightly inwardly from the corners thereof formed by the junctures of side walls 22 and 24 with top and bottom walls 26 and 32, respectively. This orientation of cross bars 38 and 40 relative to top wall 26 and bottom wall 32 offers support therefor and also exerts a reaction force at the corners of sealing member 10 to prevent displacement of the sealing member corners away from surfaces 16 and 18 of structural members 12 and 14 upon compression of sealing member 10 and downward folding of its top wall. Pulling away of the bottom corners is similarly prevented, all without interfering with the desired folding of the seal. While the reaction force of the present invention is sufficient to resist the tendency of such corners to roll away or be displaced from the adjoining support surfaces during compression, it is low enough to permit deformation of sealing member 10, as shown in FIG. 2, without the latter taking a permanent set.

A significant feature of this invention resides in the provision of internal support members which are preformed to facilitate folding and to ensure folding thereof in a predetermined direction, thereby selectively controlling both folding and pressure generation. Such members are herein provided in the form of bars 42 and 44 extending from cross bars 30 and 38 approximately mid-way between the intersection thereof and bottom wall 32 to side walls 22 and 24, intersecting the same approximately mid-way between the top and bottom thereof, which bars 42 and 44 comprise angularly related portions 46, 48 and 50, 52, respectively. The portions 46 and 50 extend outwardly from cross bars 40 and 38 in a direction generally normal thereto and generally parallel to the other thereof, and then join portions 48 and 52 at obtuse angles. Portions 48 and 52 extend from portions 46 and 50 upwardly at acute angles to the horizontal and intersect side walls 22 and 24. Compression bars 42 and 44 are important in providing support for the intermediate portions of side walls 22 and 24 to prevent inward buckling thereof and in providing a force acting laterally outwardly against side walls 22 and 24 to preclude displacement thereof away from the adjoining support surfaces 16 and 18 during expansion of sealing member 10 upon contraction of adjacent structural sections 12, 14. At the same time, the angular junctures between portions 46, 48 and 50, 52 define knees or bends which facilitate the folding of compression bars 42 and 44 into the generally, triangular spaces formed by members 22, 24, 38 and 40 in the opposite sides of sealing member 10 during the compression thereof. Because of these knees, compression bars 42 and 44 offer far less resistance to the inward movement of side walls 22 and 24 during compression of sealing member 10 than they would if they were straight and not preformed each with an included angle therein. As a result, side walls 22 and 24 and the overall sealing member body are not unduly stressed, thereby limiting the maximum reactive force exerted by the seal in normal use and preventing any portion of the seal from taking a permanent set. This feature together with the location of the terminal ends of intersecting cross bars 38 and 40 away from the corners of sealing member 10 enables the latter to yield readily under compression while still maintaining a laterally outwardly directed reaction force exerted against the sealing member side walls 22 and 24 along their entire outer surfaces sufficient to prevent separation thereof from the adjoining support surfaces 16 and 18.

The cross sectional configuration of sealing member 10 is such that a relatively large open area is available for the reception of the folded top wall, cross bars 38, 40 and compression bars 42, 44 when sealing member 10 is in the compressed state as shown in FIG. 2. Surface contact between the various folded portions of the seal in this compressed condition is insufficient to induce a permanent set. In addition, to facilitating folding and thereby reducing the reactive force, pre-forming a break or knee in compression bars 42, 44 controls the direction of folding thereof, ensuring folding of bars 42, 44 in the desired direction into the spaces provided and avoiding unwanted surface contact prior to maximum compression.

A sealing member as described above satisfactorily met a force-deflection specification requiring a seal having a width of 1¼ inches in the normal, uncompressed state to produce a minimum reaction force of three pounds per lineal inch when compressed to a width of one inch and to produce a maximum reaction force not to exceed twelve pounds per lineal inch when compressed to a width of five-eighths of an inch. This latter requirement can not be met by many conventional seals which generate a maximum reaction force considerably in excess of that.

From the foregoing, it is apparent that the objects of the present invention have been fully accomplished. As a result of this invention, an improved sealing member is provided having a simple internal truss structure with large open areas to receive various folded portions of the sealing member during compression, and incorporating compression bars which are pre-formed to facilitate the controlled folding thereof in a manner permitting a reduced maximum reaction force while providing adequate support to the seal.

A preferred embodiment of this invention having been described and illustrated, it is to be understood that this has been done by way of illustration only.

I claim:

1. In a sealing member a resiliently yieldable tubular body, and an internal supporting truss structure within said body formed integral therewith, said internal truss structure including a pair of cross bars extending downwardly in oppositely inclined directions and intersecting intermediate their opposite ends, and a pair of compression bars extending from said side walls intermediate the upper and lower ends thereof to said cross bars at points between the intersection thereof and the ends thereof, each of said compression bars having angularly related portions formed to facilitate the controlled folding thereof.

2. A sealing member as set forth in claim 1, said body including top, bottom and opposite side walls, said cross bars extending downwardly at an angle from said top wall to said bottom wall, said compression bars joining said cross bars at points spaced below the intersection thereof.

3. A sealing member according to claim 2 wherein said top wall has downwardly sloping portions forming a V-shaped recess and adapted to fold into the upper space defined by said intersecting cross bars when said side walls are pressed toward each other.

4. A sealing member according to claim 2 wherein said intersecting cross bars define relatively large spaces into which portions of said sealing member can collapse during compression thereof.

5. In a sealing member a resiliently yieldable tubular body, and an internal supporting truss structure within said body formed integral therewith, said internal truss structure including a plurality of cross bars and a pair of compression bars, each having angularly related portions formed to facilitate the controlled folding thereof, said body including top, bottom and opposite side walls, said truss structure including a pair of cross bars extending downwardly at an angle from said top wall to said bottom wall, said cross bars intersecting intermediate their opposite ends, said compression bars extending from said side walls intermediate the upper and lower ends thereof to said cross bars at points spaced below the intersection thereof, said side walls terminating at said top and bottom walls, respectively, to form corners therewith, and said intersecting cross bars terminating at said top and bottom walls slightly inwardly of said corners.

6. In a sealing member a resiliently yieldable tubular body, and an internal supporting truss structure within said body formed integral therewith, said internal truss structure including a plurality of cross bars and a pair of compression bars having angularly related portions formed to facilitate the controlled folding thereof, said body including top, bottom and opposite side walls, said truss structure including a pair of cross bars extending downwardly at an angle from said top wall to said bottom wall, said cross bars intersecting intermediate their opposite ends, said compression bars extending from said side walls intermediate the upper and lower ends thereof to said cross bars at points spaced below the intersection thereof, said compression bars being angularly bent and having first portions extending from said cross bars in directions generally normal thereto and second portions extending from said first portions upwardly at an angle to said side walls intermediate the upper and lower ends thereof.

* * * * *